US005529753A

United States Patent [19]

Haddad et al.

[11] Patent Number: 5,529,753

[45] Date of Patent: Jun. 25, 1996

[54] SYSTEM FOR ULTRASONIC ENERGY COUPLING BY IRRIGATION

[75] Inventors: Antoine E. Haddad, Miami, Fla.; John C. Mazza, El Toro, Calif.

[73] Assignee: Dade International Inc., Deerfield, Ill.

[21] Appl. No.: 89,001

[22] Filed: Jul. 9, 1993

[51] Int. Cl.$^6$ .............................................. G01N 21/01

[52] U.S. Cl. ............................... 422/64; 422/63; 422/65; 422/66; 366/110; 366/116; 366/127; 239/102.2; 73/644

[58] Field of Search ......................... 239/102.2; 310/323, 310/325; 366/110, 114, 127, 116, 118, 208; 422/63–66; 134/148, 174, 184; 73/644

[56] References Cited

U.S. PATENT DOCUMENTS

| | | | |
|---|---|---|---|
| 2,751,783 | 6/1956 | Erdman | 73/67 |
| 3,083,718 | 4/1963 | Heinicke | 134/174 |
| 3,214,101 | 10/1965 | Perron | 310/325 X |
| 3,373,752 | 3/1968 | Inoue | 134/1 |
| 3,807,704 | 4/1974 | Janzen et al. | 259/72 |
| 3,873,071 | 3/1975 | Tatebe | 259/72 |
| 4,003,518 | 1/1977 | Hori et al. | 366/116 X |
| 4,064,885 | 12/1977 | Dussault et al. | 134/148 X |
| 4,301,968 | 11/1981 | Berger et al. | 239/102.2 |
| 4,326,553 | 4/1982 | Hall | 134/184 X |
| 4,393,991 | 7/1983 | Jeffras et al. | 239/102.2 |
| 4,403,510 | 9/1983 | de Walle et al. | 73/644 |
| 4,445,064 | 4/1984 | Bullis | 310/316 |
| 4,507,969 | 4/1985 | Djordjevic et al. | 73/644 |
| 4,528,159 | 7/1985 | Liston | 422/65 |
| 4,607,185 | 8/1986 | Elbert et al. | 310/323 |
| 4,659,014 | 4/1987 | Soth et al. | 310/325 X |
| 4,720,374 | 1/1988 | Ramachadran | 422/102 X |
| 4,764,021 | 8/1988 | Eppes | 366/127 |
| 4,798,332 | 1/1989 | Lierke et al. | 310/323 X |
| 4,834,124 | 5/1989 | Honda | 134/184 |
| 5,001,932 | 3/1991 | Light et al. | 73/644 |

FOREIGN PATENT DOCUMENTS

| | | |
|---|---|---|
| 4-213827 | 8/1992 | Japan . |
| 2243092A | 10/1991 | United Kingdom . |
| WO86/04737 | 8/1986 | WIPO . |

*Primary Examiner*—James C. Housel
*Assistant Examiner*—Arlen Soderquist
*Attorney, Agent, or Firm*—Vasilios D. Dossas; Tilton, Fallon, Lungmus & Chestnut

[57] ABSTRACT

A system for ultrasonic energy coupling includes an ultrasonic transducer, a horn member defining a passageway, and a pump for moving fluid through the passageway and outwardly of the horn. The method used to accomplish the energy coupling or transfer includes vibrating the horn member with an ultrasonic transducer and pumping fluid through the passageway in the horn member and onto an object.

7 Claims, 2 Drawing Sheets

FIG. 1
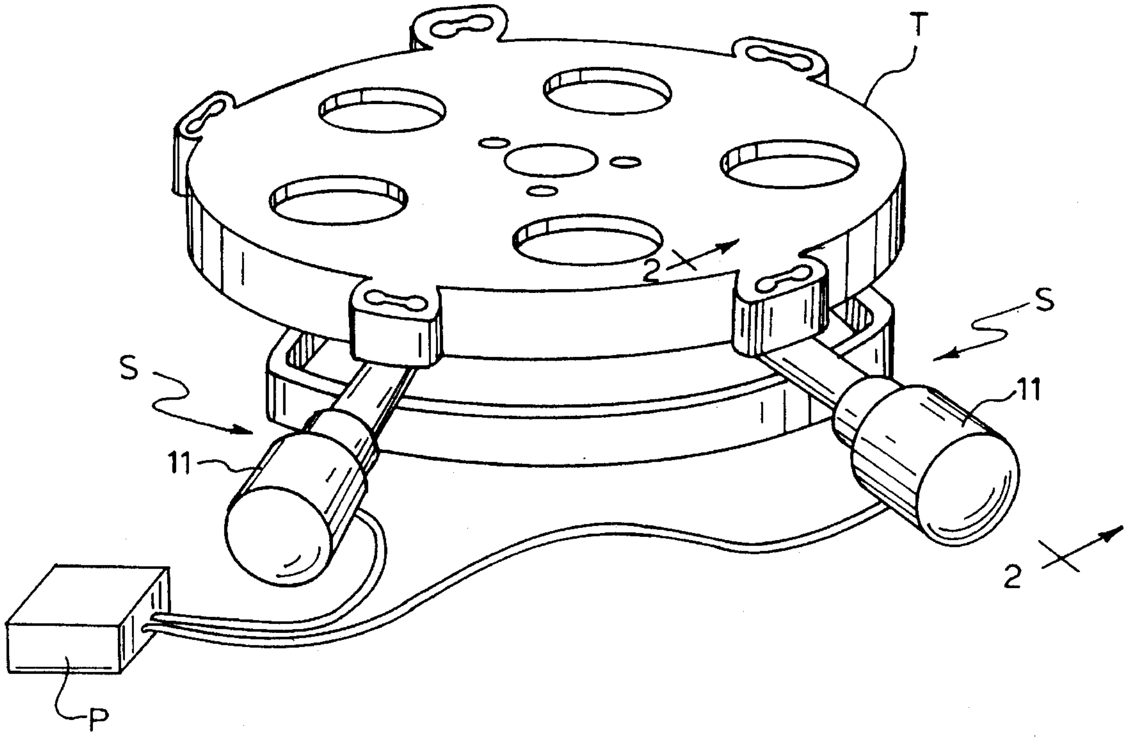
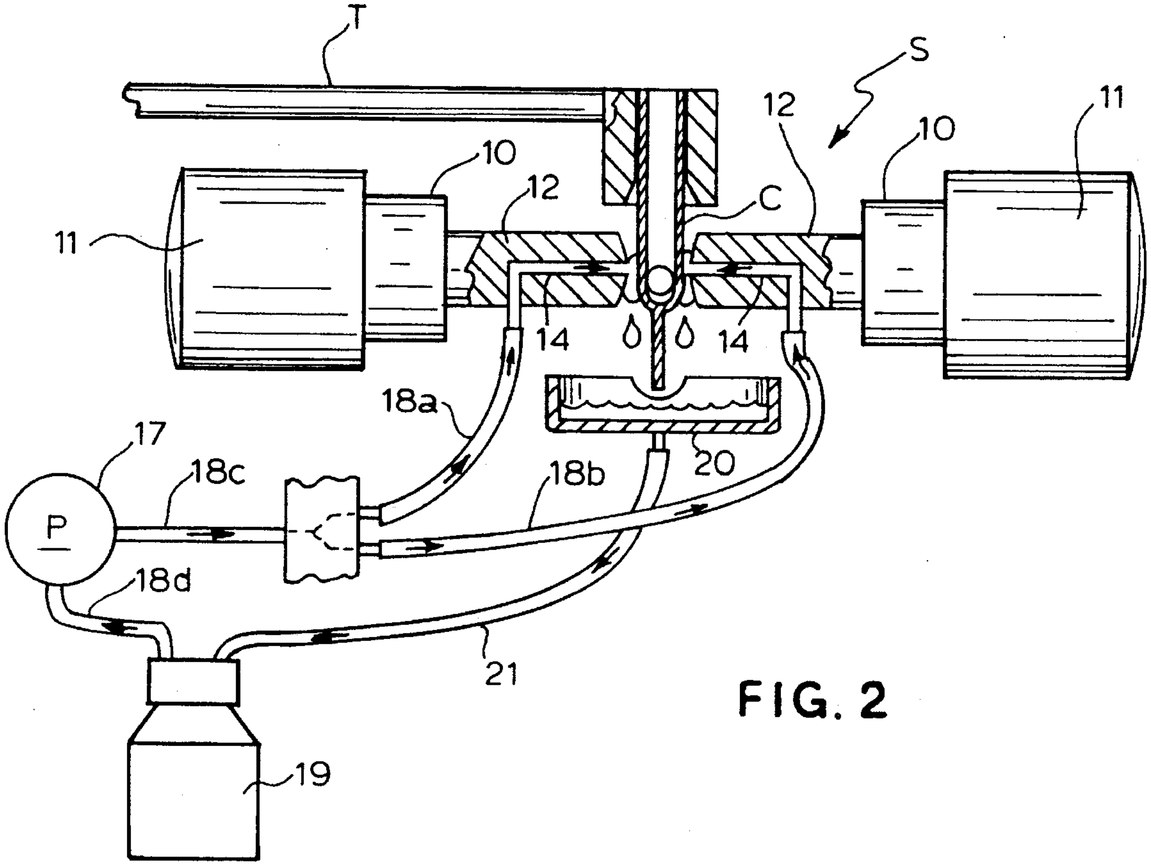
FIG. 2

SYSTEM FOR ULTRASONIC ENERGY COUPLING BY IRRIGATION

BACKGROUND OF THE INVENTION

1. Field Of The Invention

The present invention relates to a system and method for ultrasonic energy coupling, and more particularly to a system and method for transferring vibratory mechanical energy to an object by irrigating the object with a fluid.

2. Description Of The Prior Art

The present invention finds particular utility in automated analysis instrument systems in which it may facilitate mixing liquids with other liquids or powders with liquids and/or dissolving tablets in liquids. However, the present invention has utility in a wide variety of other applications which require similar functions.

Some prior analysis instrument systems use ultrasonic energy to provide mixing and other functions. U.S. Pat. No. 4,528,159 to Liston describes such a system with an assembly for dissolving reagent tablets. The assembly includes a continuous cuvette belt which advances reaction compartments into a liquid bath and an ultrasonic horn disposed in the bath which transfers the energy from the horn to the reaction compartments. This assembly is unnecessarily complex and expensive to manufacture. In addition, it does not provide an efficient transfer of energy.

Another prior practice for mixing or dissolving sample constituents includes placing the tip of an ultrasonic horn directly into a sample to accomplish the intended function. This practice presents cross-contamination problems in automated applications in which a system must provide the intended function to a large number of samples. Such applications require an additional washing step to remove contaminants from the horn tip.

The present invention avoids the disadvantages of the prior devices and practices. It provides a simple and effective system and method of transferring vibratory mechanical energy to an object by irrigating the object with an energy transferring fluid.

SUMMARY OF THE INVENTION

In accordance with one embodiment of the present invention, a system for transferring vibratory mechanical energy to an object includes an ultrasonic transducer which converts electrical energy (provided by a power supply) to vibratory mechanical energy. A horn member connected to the transducer receives the vibratory mechanical energy provided by the transducer and transfers it to a fluid which contacts the horn member. The horn member defines at least one passageway through which the fluid flows.

A pump assembly moves the fluid from a fluid source, through the passageway of the horn member, outward of the horn member, and onto an object. This assembly includes a pump and conduits through which the fluid moves from the fluid source to the horn member. The fluid source includes a container assembly for receiving the fluid flowing off of the object and providing fluid for further irrigation.

The method of ultrasonic energy coupling employed in the system includes vibrating a horn member with an ultrasonic transducer. It also includes pumping a fluid into contact with the vibrating horn member and then onto an object, thus, irrigating the object with the fluid. Accordingly, the fluid transfers the vibratory mechanical energy of the horn member to the object.

BRIEF DESCRIPTION OF THE DRAWINGS

For a more complete understanding of this invention one should now refer to the embodiment illustrated in greater detail in the accompanying drawings and described below by way of an example of the invention. In the drawings:

FIG. 1 is a perspective view of a transfer assembly of an instrument employing the system of the present invention.

FIG. 2 is a sectional view taken along line 2—2 in FIG. 1, showing the ultrasonic energy coupling system with two ultrasonic horns irrigating a container.

While the following disclosure describes the invention in connection with one embodiment and a modification of the embodiment, one should understand that the invention is not limited to this embodiment. Furthermore, one should understand that the drawings are not to scale and that graphic symbols, diagrammatic representations, and fragmentary views may, in part, illustrate the embodiment. In certain instances, the disclosure may not include details which are not necessary for an understanding of the present invention.

DETAILED DESCRIPTION OF THE DRAWINGS AND AN EMBODIMENT

Turning now to the drawings, FIG. 1 illustrates a rotatable transfer assembly T with ultrasonic energy coupling systems S of the present invention at two locations proximate the transfer assembly. The transfer assembly T moves enclosures C (e.g., a cuvette or a pair of cuvettes) to the systems S which facilitate mixing liquids with other liquids, powders with liquids, or tablets with liquids disposed in the enclosures.

As shown in FIG. 2, each system S includes a pair of ultrasonic transducer and horn assemblies 10. The transducer 11 of each assembly may be any one of a wide variety of commercially available transducers which convert electrical energy (provided by a suitable power supply P) into vibratory mechanical energy. One such transducer is Model No. VC40 sold by Sonics and Materials Inc. of Danbury, Conn.

Figure 4:
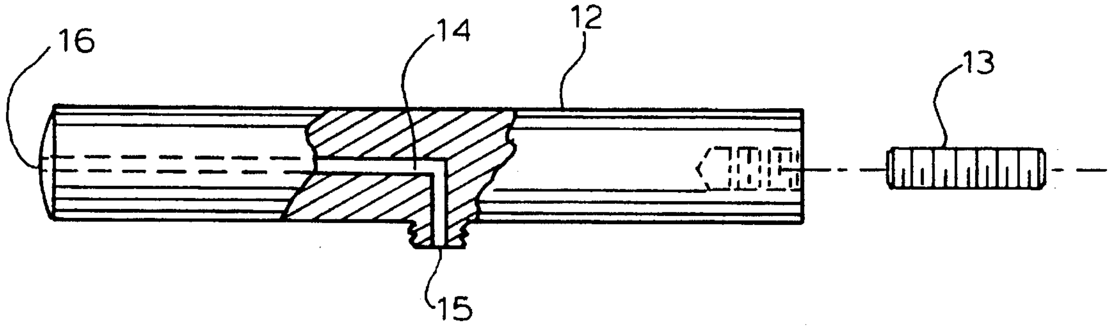
FIG. 4 is a perspective view of an ultrasonic horn used in the system of the present invention.

The horn member 12 of each assembly receives the vibratory energy from the corresponding transducer 11 and transfers it to a fluid as described below. The member 12 is an elongated member coupled at a first end to a transducer 11 and made of aluminum, titanium, stainless steel or any other solid with good acoustical energy transfer characteristics. (See FIG. 4) A threaded stud 13 secures the first end of the horn member 12 to the corresponding transducer 11 (See FIG. 2). The other end has a rounded configuration to focus the vibratory energy outwardly of the horn.

Each horn member 12 defines a passageway 14, drilled, cast, or otherwise formed into the horn member. The passageway is a round, generally L-shaped bore with an inlet 15 disposed on the side of the member and an outlet 16 disposed at a second end of the member, opposite the first end. By way of a specific example, a horn member was fabricated with a passageway having the configuration shown in FIG. 4 and a round cross-section with a constant diameter of approximately 0.050 inches.

Alternatively, the passageway may have any suitable configuration and any suitable cross-section. For example, the passageway may extend through the transducer 11 and across the horn member 12, from one end to the other. In addition, the horn member 12 may include more than one passageway or a passageway with one inlet portion, a manifold portion in close proximity to a nodal point along the length of the horn 12, and two or more outlet portions. The outlet portions may lie side-by-side or one on top of the other.

A pump 17 and conduits 18*a–d* move a fluid, (e.g., Ethelyne Glycol, water, liquids less viscous than water, and liquids more viscous than water) from a container 19 to the two horn members 12 and through the passageway 14 of each horn member 12 so that the horn members 12 may transfer the vibratory mechanical energy they receive from the transducers 11 to the fluid. The pump forces the fluid out of the passageway outlets 16 under pressure; and the fluid contacts the enclosure or compartment C.

Generally, air has poor acoustical conductivity. Accordingly, the air surrounding the distal ends of the horn members acts as a channeling medium for the acoustical energy which finds an easier path through the irrigation fluid onto the container. Thus, the horn tip focuses the vibratory energy onto the container.

The pump 17 is a peristaltic pump or any other suitable, conventional pump. The conduits 18*a–d* are suitably sized plastic tubing connected with fittings to the pump 17 and the horn members 12. The enclosure or compartment C is a cuvette or a pair of cuvettes made of plastic. Alternatively, the enclosure C may be a tube made of glass or plastic. In addition, it may be part of a strip of multiple cuvettes or a continuous cuvette belt.

The enclosure C contains the sample constituents which the systems S mix or dissolve. The transfer assembly T supports the enclosure and moves it to the position shown in FIG. 2. In this position, the enclosure C lies between the two ultrasonic transducer and horn assemblies 10 by the transfer assembly T.

The transport assembly T (to which the enclosure lies releasably secured) allows unobstructed flow of fluid between the horn members 12 and the enclosure C. The enclosure C does not contact the horn members 12. However, it lies proximate the outlets 16 of the horn members where the fluid discharge of the horn members may contact it. The horn members of the two ultrasonic transducer and horn assemblies 10 direct the fluid in opposite directions and onto the enclosure C.

A receptacle 20 with an open top receives fluid flowing off the outer surface of the enclosure C through its open top. This fluid discharges from the receptacle, through a conduit 21, and into the container 19 which provides fluid to the conduits 18*a–d* for further irrigation of the enclosure C.

Figure 3:
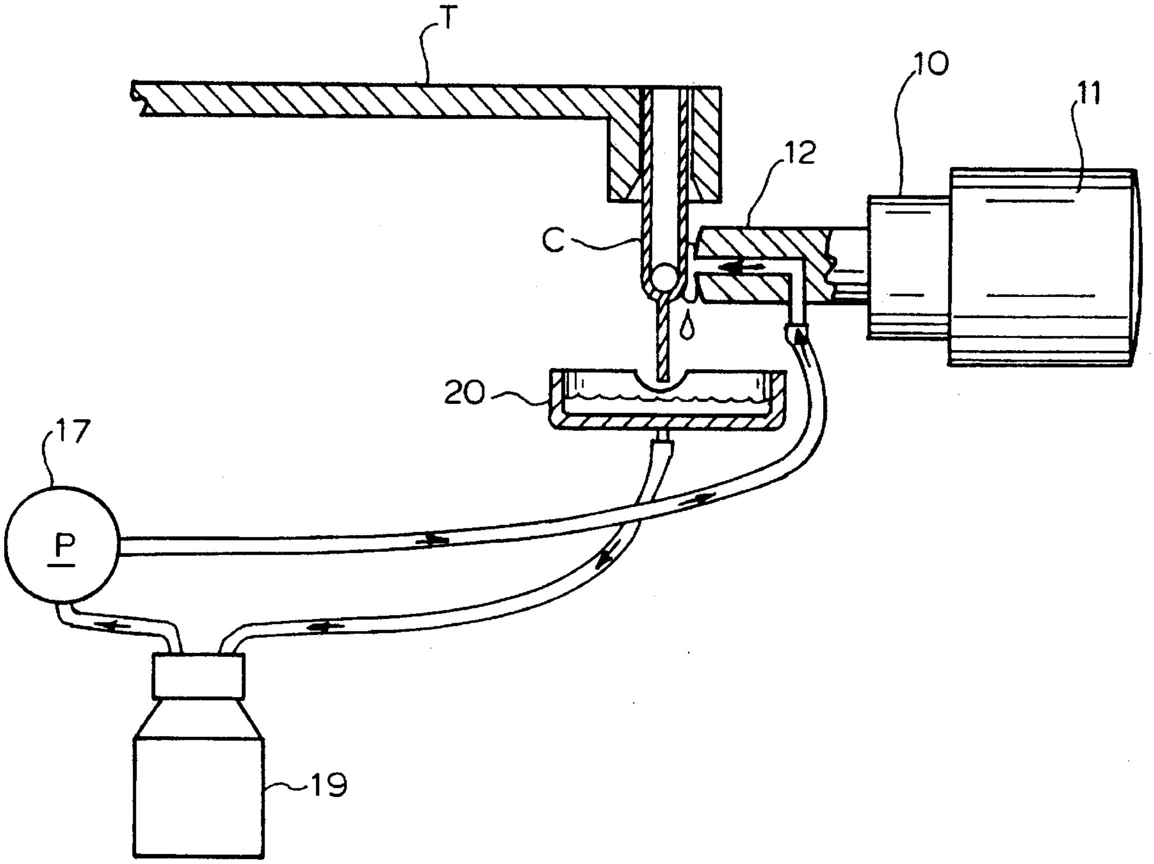
FIG. 3 is the sectional view of FIG. 2, showing a modification of the system of FIG. 2 with one ultrasonic horn irrigating the container.

FIG. 3 shows a modification of the embodiment shogun in FIG. 2. This modified system S includes only one ultrasonic transducer and horn assembly which irrigates only one side portion of the enclosure C. Another alternative may include providing three or more ultrasonic transducer and horn assemblies disposed around a predetermined location so that they do not obstruct the movement of the enclosure in and out of the location.

While the above text and the drawings illustrate one embodiment and a modification of that embodiment, one will understand that the invention is not limited to this embodi- ment and modification. Those skilled in the art to which the invention pertains may make modifications and other embodiments employing the principles of this invention particularly upon considering the foregoing teachings. Therefore, by the appended claims, the applicants intend to cover any such modifications and other embodiments as incorporate those features which constitute the essential features of this invention.

What is claimed is:

1. In combination with a sample enclosure containing a liquid or a liquid and a solid, a system for vibrating the enclosure and mixing the liquid or dissolving the solid in the liquid, said system including: ultrasonic transducer means for converting electrical energy to vibratory mechanical energy; horn member means connected to the transducer means for receiving the vibratory mechanical energy provided by the transducer means and transferring it to a fluid, said horn member means defining passageway means through which the fluid flows; a fluid source for providing the fluid; a pump for moving the fluid from the fluid source to the horn member, through the passageway means and outwardly of the horn member so that the fluid may contact the outer surface of the sample enclosure, and a moveable support member for supporting the enclosure and moving the enclose proximate the horn member.

2. The system of claim 1, wherein the transducer means includes a pair of transducers and the horn member means includes a corresponding pair of horn members which direct the fluid in opposite directions towards the enclosure.

3. A system for ultrasonic energy coupling, said system comprising:

(a) an enclosure for containing a liquid or a liquid and a solid;

(b) a moveable support member for moving the enclosure and holding the enclosure at a predetermined position;

(c) ultrasonic transducer means for converting electrical energy to vibratory mechanical energy;

(d) horn member means connected to the transducer means and disposed proximate the enclosure at the predetermined position for receiving the vibratory mechanical energy provided by the transducer means and transferring it to a fluid, said horn member means defining passageway means through which the fluid flows;

(e) pump means for receiving fluid from a fluid source and moving the fluid through the passageway means, outwardly of the horn member means, and onto the enclosure to vibrate the enclosure and mix the liquid or dissolve the solid in the liquid.

4. The system of claim 3, wherein the fluid source includes a receptacle with an inlet for receiving the fluid flowing off of the surface of the enclosure and an outlet for discharging the fluid from the receptacle to the pump means.

5. The system of claim 4, wherein the pump means includes a pump and conduits through which fluid flows from the receptacle to the pump and from the pump to the horn member means.

6. The system of claim 3, wherein the transducer means includes a pair of transducers and the horn member means includes a corresponding pair of horn members which direct the fluid in opposite directions towards the enclosure.

7. The system of claim 3, wherein the support member is rotatable.

* * * * *